(No Model.)
S. E. CRIPE.
EGG BEATER, &c.
No. 554,170. Patented Feb. 4, 1896.
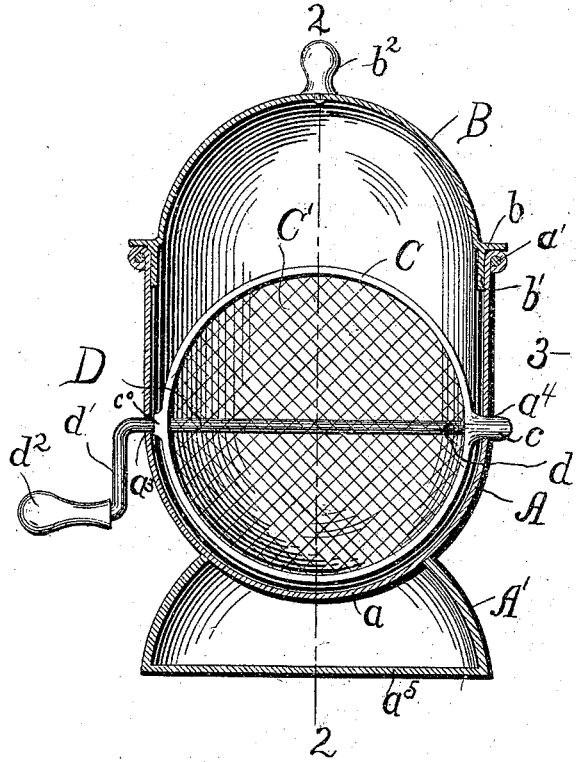
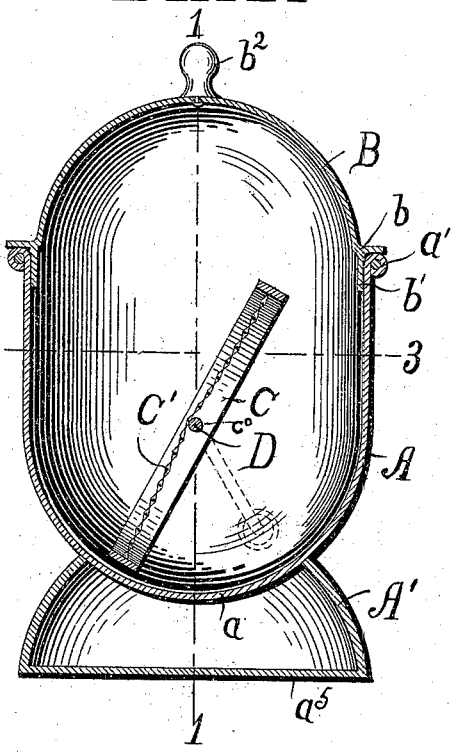
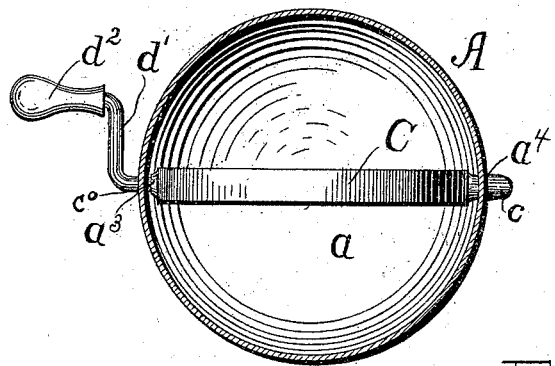
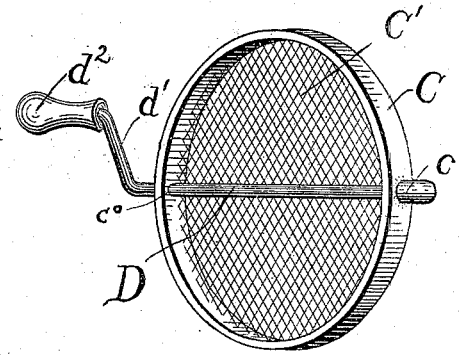
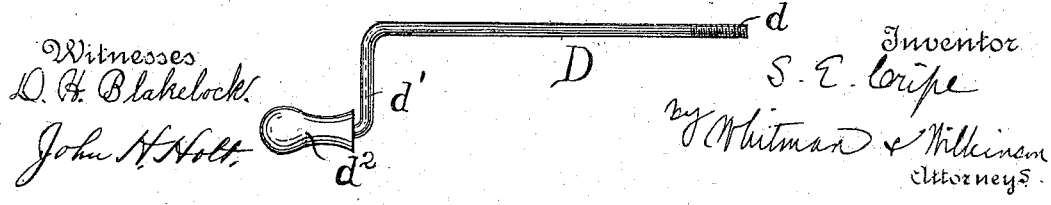
Witnesses
D. H. Blakelock.
John H. Holt.
Inventor
S. E. Cripe
by Whitman & Wilkinson
Attorneys.

United States Patent Office.

SARA E. CRIPE, OF INDIANAPOLIS, INDIANA.

EGG-BEATER, &c.

SPECIFICATION forming part of Letters Patent No. 554,170, dated February 4, 1896.

Application filed October 11, 1895. Serial No. 565,389. (No model.)

*To all whom it may concern:*

Be it known that I, SARA E. CRIPE, a citizen of the United States, residing at Indianapolis, in the county of Marion and State of Indiana, have invented certain new and useful Improvements in Cake-Mixers and Egg-Beaters; and I do hereby declare the following to be a full, clear, and exact description of the invention, such as will enable others skilled in the art to which it appertains to make and use the same.

My invention relates to improvements in cake-mixers, and it consists of an improved device for beating eggs, mixing cakes, and kindred purposes, which will be hereinafter more fully described and claimed.

Reference is had to the accompanying drawings, in which the same parts are indicated by the same letters throughout the several views.

Figure 1 represents a vertical section through the utensil made by the plane 1 1 of Fig. 2. Fig. 2 represents a vertical section made by the plane 2 2 of Fig. 1. Fig. 3 represents a horizontal section made by the plane 3 3 of Fig. 2, and looking down, but the rotary beater is shown in the vertical position. Fig. 4 represents a perspective view of the beater and handle detached from the utensil, and Fig. 5 represents a plan view of the detachable handle as separated from the other parts of the utensil.

A represents the inclosing vessel, which is preferably provided with a spherical base $a$, mounted upon any suitable support. I prefer to have the said support in the form of a zone of a sphere, as shown at A' in Figs. 1 and 2, with a closed base $a^5$, but this closed base $a^5$ may be omitted and any other suitable form of support for the utensil may be adopted if desired.

The top of this utensil is preferably provided with a bead $a'$ to receive the flanges $b$ and $b'$ of the cover B, which cover is ordinarily provided with a knob $b^2$ for convenience in lifting the same. The vessel A is also provided with a perforation $a^3$ for the spindle D, and with a perforation $a^4$ for the boss $c$ on the cylinder or ring C. This ring may be made either in the form of a short cylinder, as shown, or may be made of a round cross-section if preferred. Stretched across this ring is a wire net C'. The said ring is provided with a boss $c$, which serves as one of the journals of the ring, and is provided with a female screw-thread extending therein to receive the male screw-thread $d$ on the end of the spindle D. This spindle passes through the perforation $c^0$ in the ring C and screws into the boss $c$. In case the ring C is not of sufficient thickness to receive the spindle D it may be either spread out around the portion $c^0$ or a separate sleeve may be secured thereto in any convenient way.

The spindle D is provided with a crank $d'$ and a revoluble handle $d^2$.

In order to assemble the parts of the device, the ring C is inserted in the utensil A and the boss $c$ passed through the perforations $a^4$. The spindle D is then passed through the hole $c^0$ in the ring C, and the screw-threaded portion $d$ is screwed into the boss $c$. Since it would ordinarily be the practice to rotate the handle with the hands of a watch, the screw-thread $d$ and the corresponding screw-threads in the boss $c$ should be cut in the opposite direction so that the rotation of the handle $d^2$ would normally tend to screw the spindle D tight in the boss $c$, and thus during the operation of the device there would be no tendency for the ring to become loose on the spindle.

In order to clean the utensil, or to disassemble the parts for any reason, hold the ring C and at the same time turn the handle $d^2$ in the opposite direction and the spindle D will become unscrewed and may be readily slipped through the holes $c^0$ and $a^3$, thus allowing the ring C to be taken out and cleaned, while the smooth inner surface of the vessel A may be readily washed and wiped out of any particles that may adhere thereto. In this manner the device may be always kept fresh and clean, and the beater may be put in place or removed whenever desired.

The various advantages of the herein-described construction would readily suggest themselves to any intelligent cook.

It will be obvious that various modifications might be made which could be used without departing from the spirit of my invention.

Having thus described my invention, what I claim, and desire to secure by Letters Patent of the United States, is—

In a cake-mixer, the combination with a vessel having the interior surface of its bottom in the form of a zone of a sphere, of a ring provided with a boss projecting through one side of the said vessel, and a wire-netting stretched across said ring, a spindle provided with screw-threads engaging in said boss and passing through the opposite side of said ring, the said ring being adapted to rotate in juxtaposition to the bottom of said vessel, and a hand-crank for rotating said spindle, substantially as described.

In testimony whereof I affix my signature in presence of two witnesses.

SARA E. CRIPE.

Witnesses:
J. C. HAMILTON,
JOS. W. PARKER.